Dec. 18, 1934.   H. B. BRAINARD   1,985,141
METHOD OF PRODUCING PILE FABRIC
Filed June 17, 1929   9 Sheets-Sheet 1
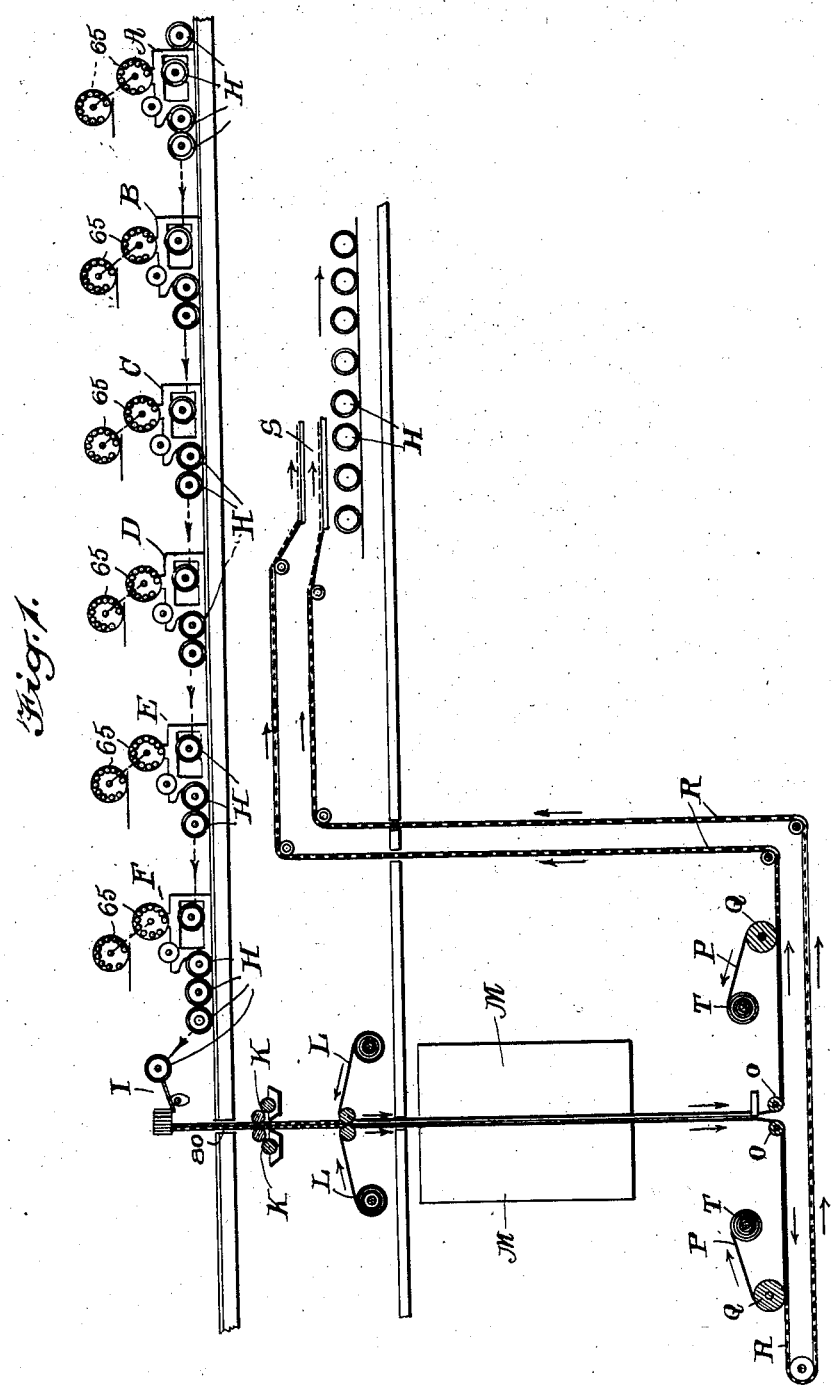
WITNESSES
INVENTOR
Horace B. Brainard
BY
ATTORNEYS Dec. 18, 1934.  H. B. BRAINARD  1,985,141
METHOD OF PRODUCING PILE FABRIC
Filed June 17, 1929   9 Sheets-Sheet 2
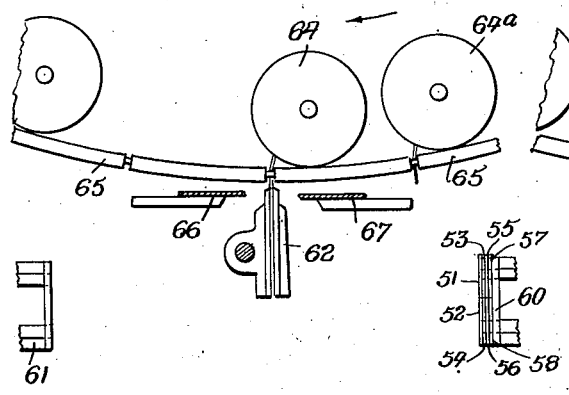
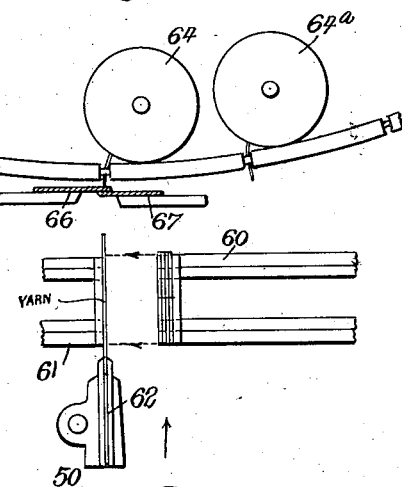
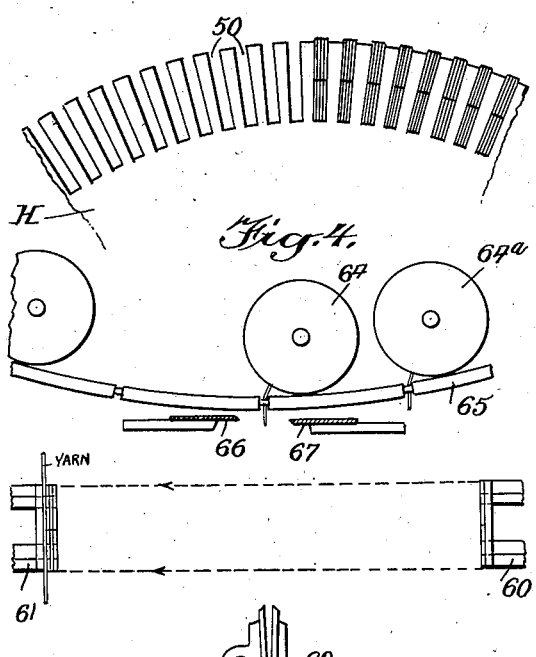
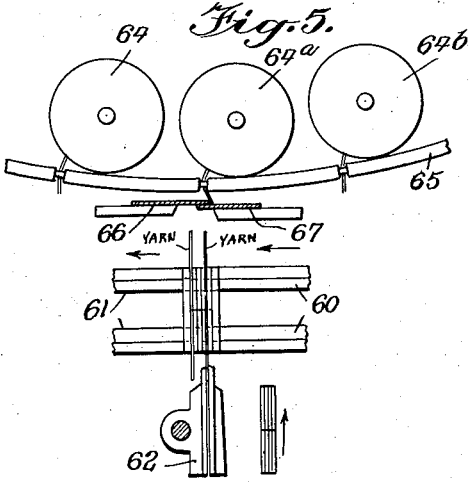
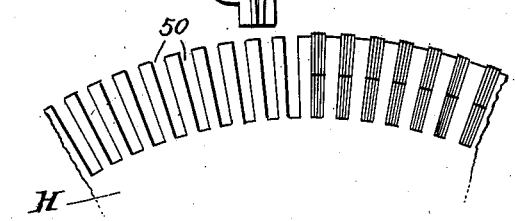
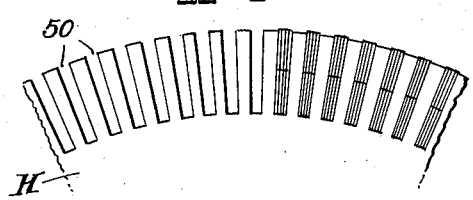
INVENTOR
Horace B. Brainard
BY
ATTORNEYS
WITNESSES

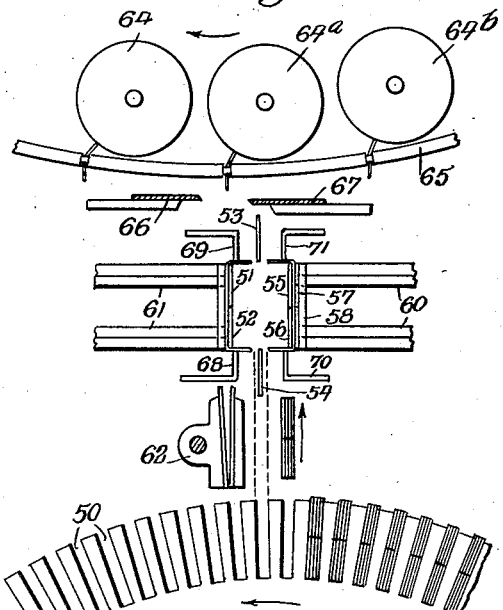
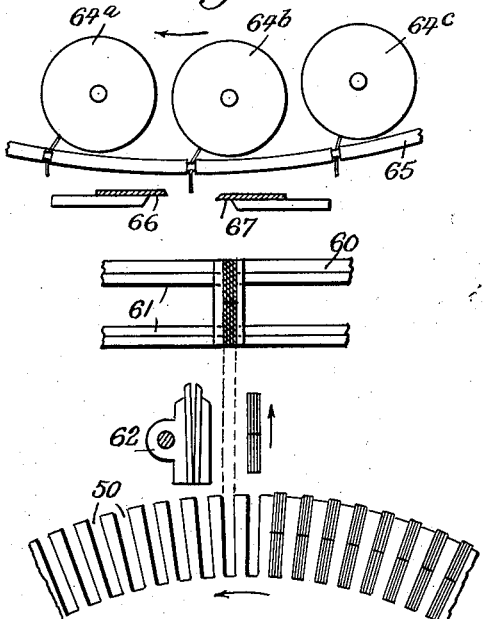
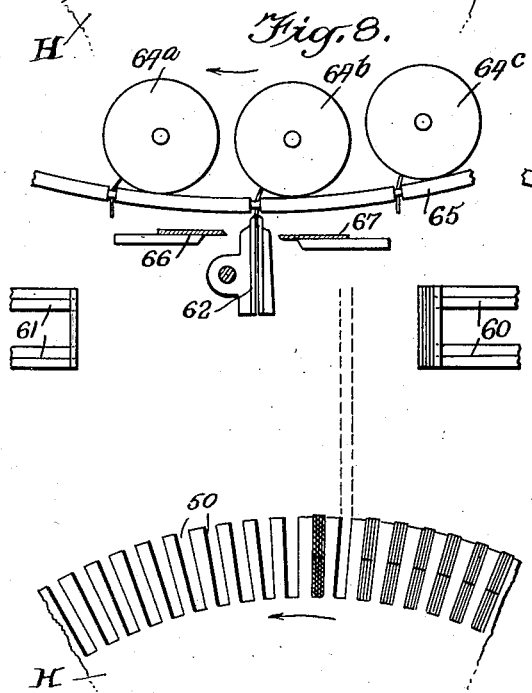
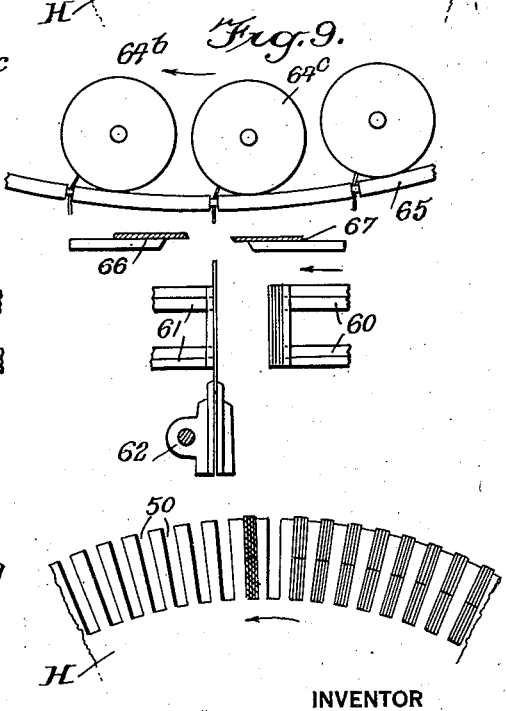

Dec. 18, 1934.   H. B. BRAINARD   1,985,141
METHOD OF PRODUCING PILE FABRIC
Filed June 17, 1929   9 Sheets-Sheet 4

WITNESSES

INVENTOR
Horace B. Brainard
BY
ATTORNEYS

Dec. 18, 1934.  H. B. BRAINARD  1,985,141
METHOD OF PRODUCING PILE FABRIC
Filed June 17, 1929    9 Sheets-Sheet 5
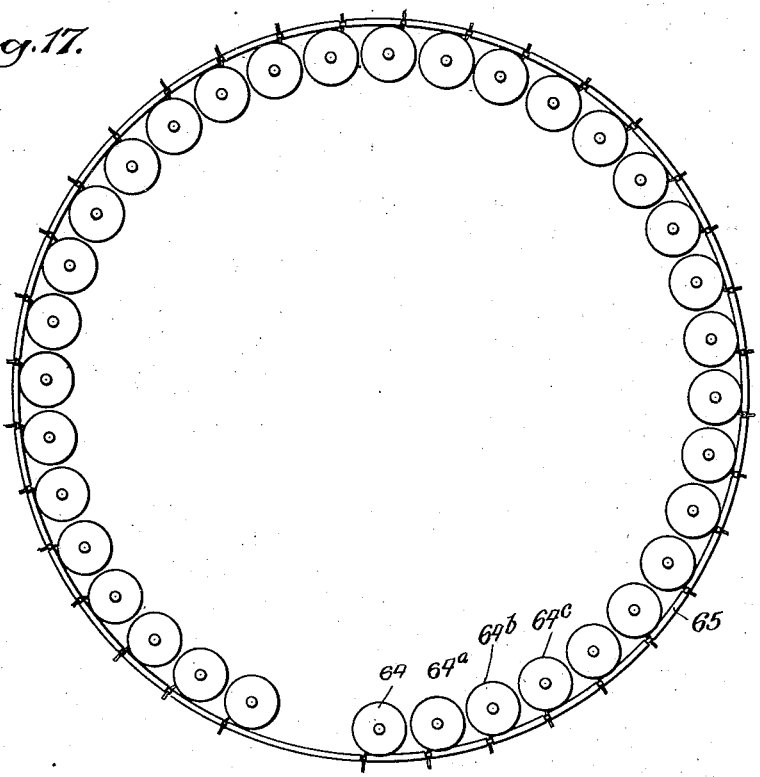
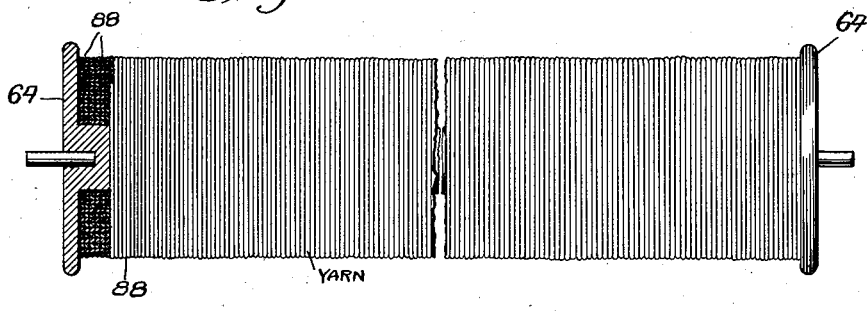
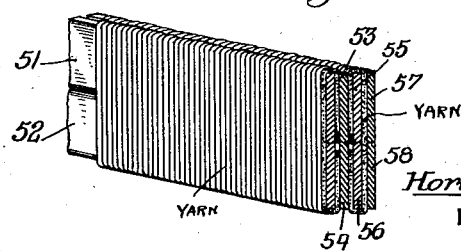
INVENTOR
Horace B. Brainard
BY
ATTORNEYS Dec. 18, 1934.    H. B. BRAINARD    1,985,141
METHOD OF PRODUCING PILE FABRIC
Filed June 17, 1929    9 Sheets-Sheet 6
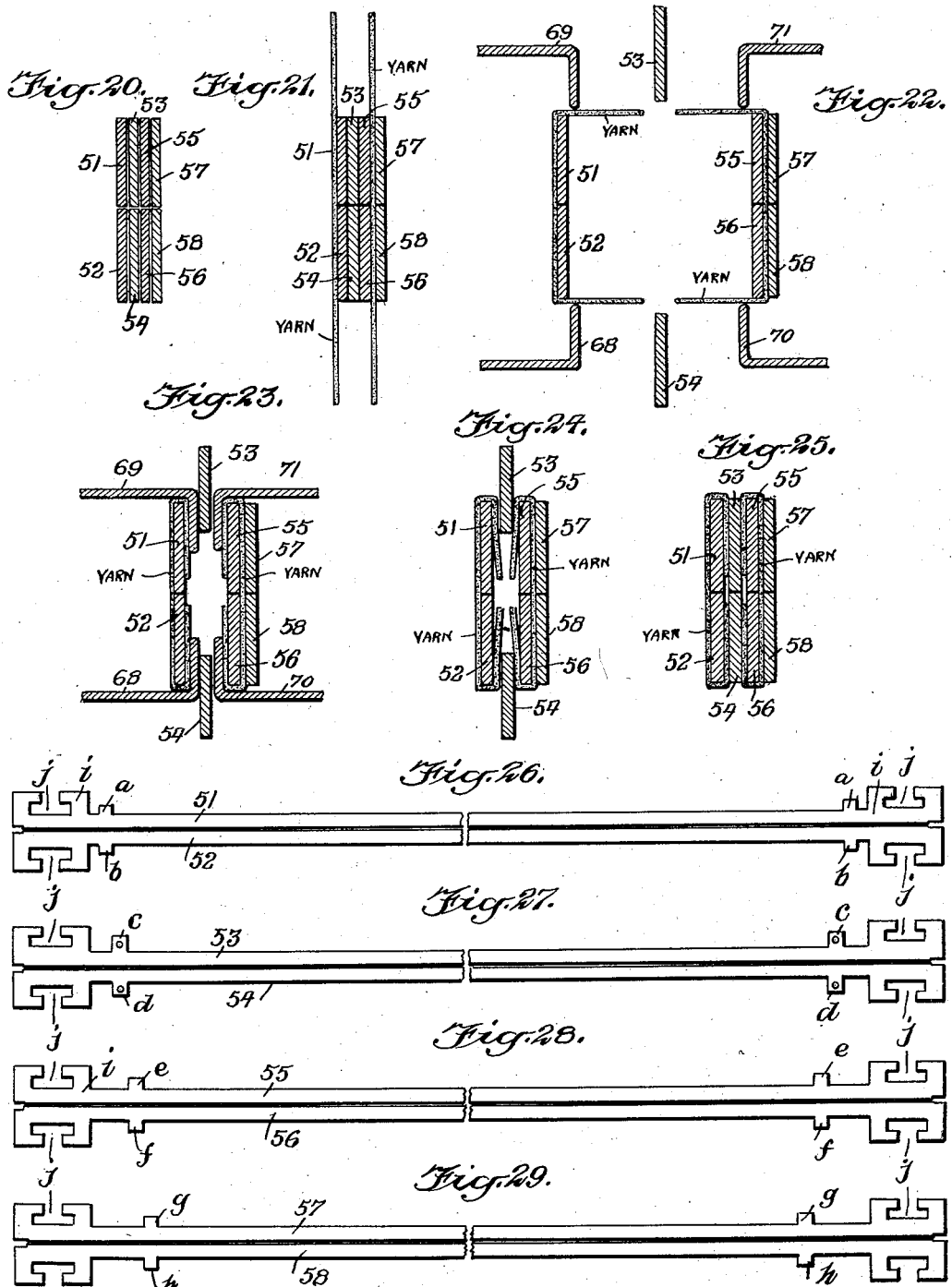

Dec. 18, 1934.  H. B. BRAINARD  1,985,141
METHOD OF PRODUCING PILE FABRIC
Filed June 17, 1929  9 Sheets-Sheet 7
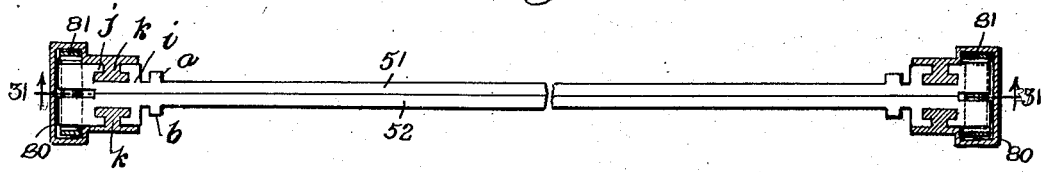
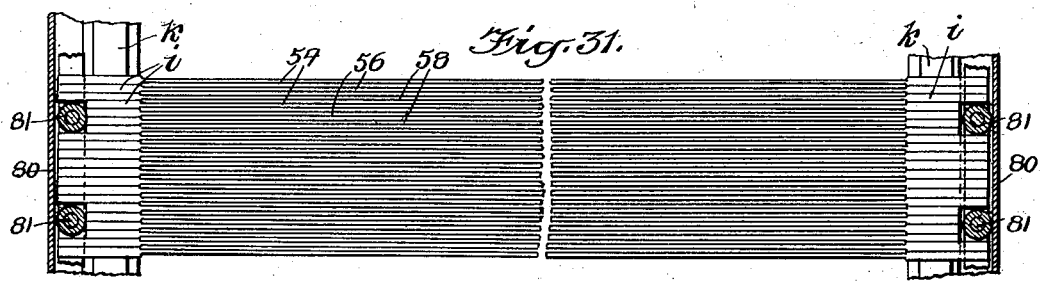
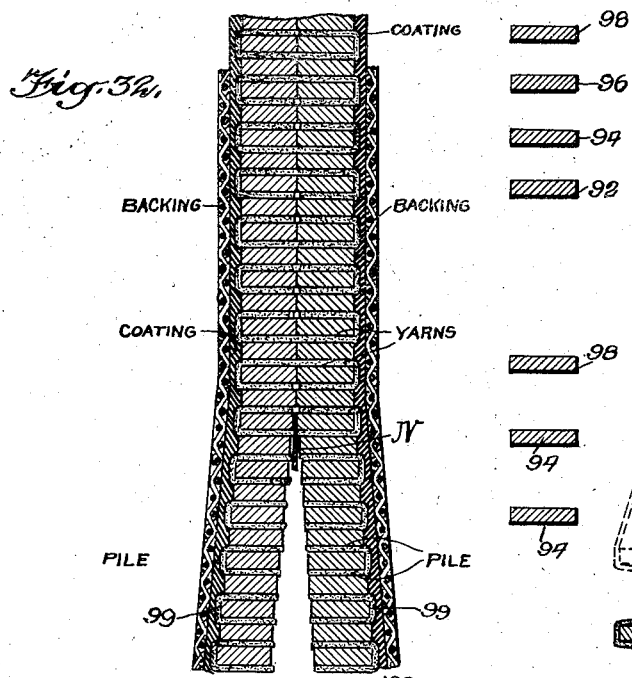
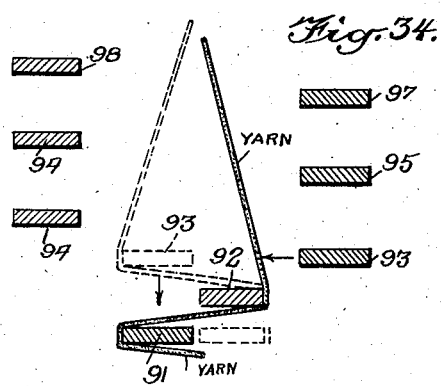
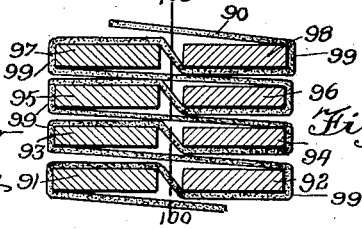
WITNESSES
INVENTOR
Horace B. Brainard
BY
ATTORNEYS Dec. 18, 1934.  H. B. BRAINARD  1,985,141
METHOD OF PRODUCING PILE FABRIC
Filed June 17, 1929  9 Sheets-Sheet 8
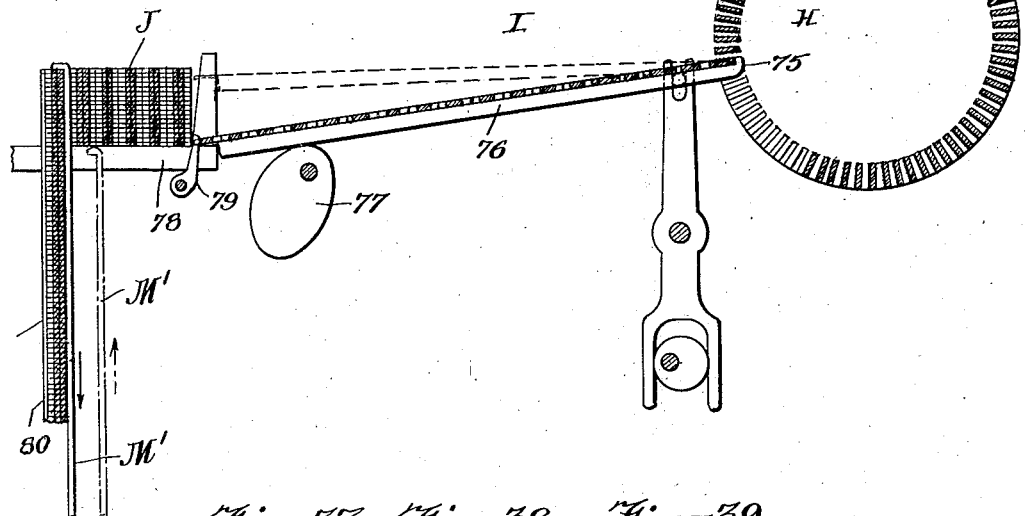
Fig. 36.
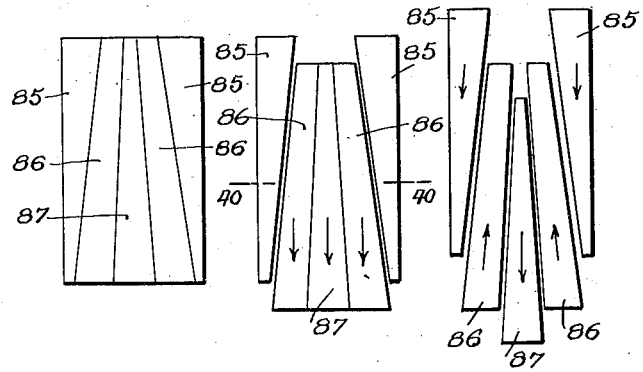
Fig. 37.  Fig. 38.  Fig. 39.
Fig. 40.
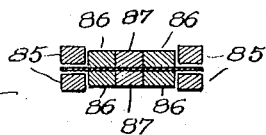
WITNESSES
INVENTOR
Horace B. Brainard
BY
ATTORNEYS

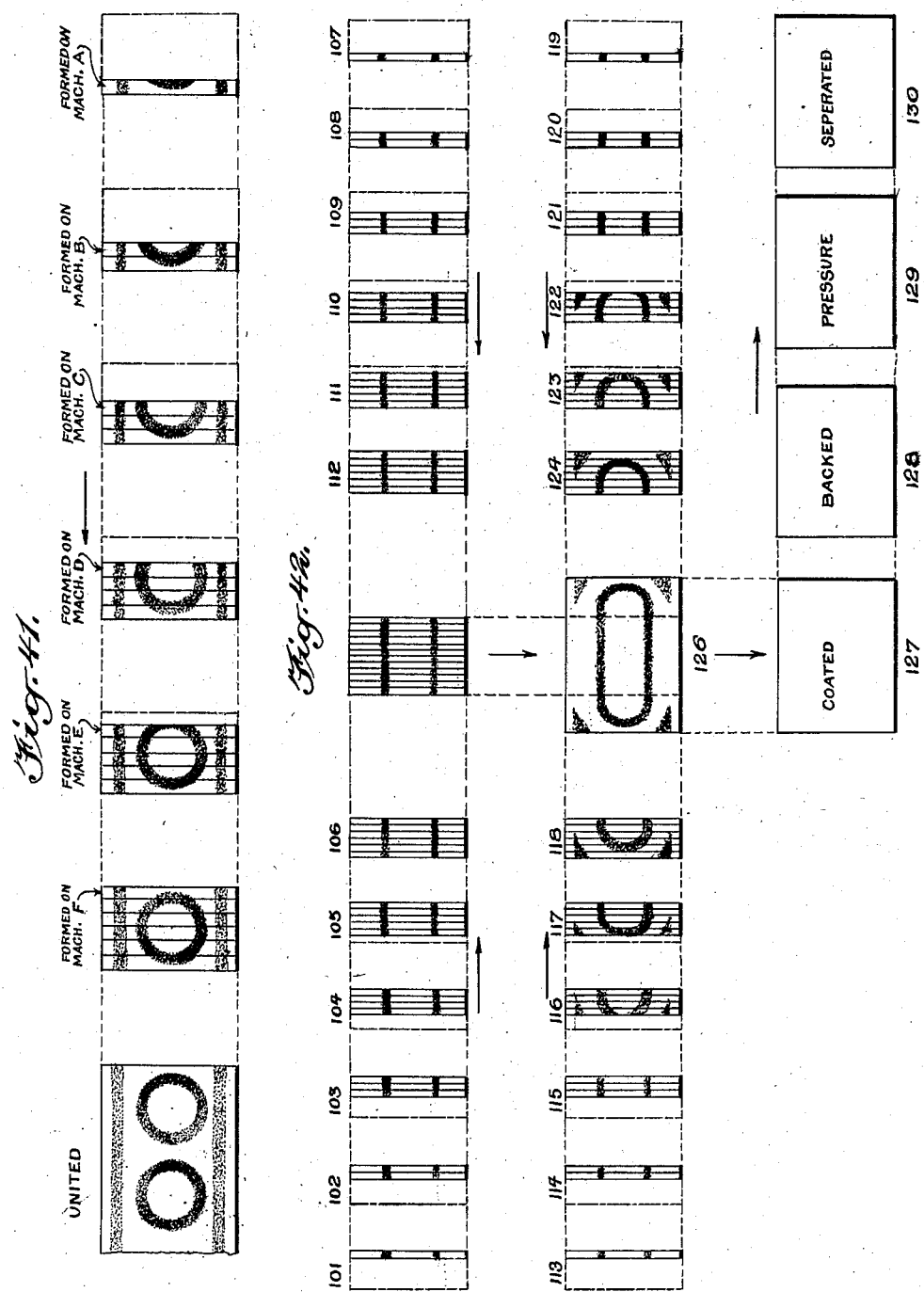

Patented Dec. 18, 1934

1,985,141

UNITED STATES PATENT OFFICE 1,985,141

METHOD OF PRODUCING PILE FABRIC

Horace B. Brainard, Thompsonville, Conn.

Application June 17, 1929, Serial No. 371,581

43 Claims. (Cl. 154—2)

This invention relates generally to the production of carpets, rugs or analogous pile fabrics, and comprehends an improved method of producing the same by applying a backing to the pile forming material subsequent to the initial temporary arrangement and support of said material in a predetermined manner without the use of a backing.

The present invention aims for one of its principal objects to produce a patterned pile fabric by initially employing means for temporarily supporting variously colored or shaded rows of dyed yarns or threads in a predetermined manner to produce the pattern and connecting a backing to the pile thus formed before separating the pile and temporary supporting means.

The invention furthermore embodies a method of producing pile fabric which consists in simultaneously building a plurality of pile areas from a pile forming material by the use of temporary supporting means, assembling said areas in contiguous relation and then connecting a backing therewith, prior to the removal of the temporary supporting means therefrom.

The invention further resides in the improved method of producing pile fabric which consists in simultaneously forming a plurality of pile areas upon temporary supporting means, assembling said areas in contiguous relation while so supported, adhesively joining the backings with the opposite surfaces of the contiguous areas and then severing the pile between the backings to produce two strips of pile fabric prior to the separation of the pile from the temporary supporting means.

As a still further object, the invention contemplates an improved method of producing pile fabric which consists in forming a continuous pile by temporarily clamping the pile forming material between wires and conveying the clamped pile to a point where a backing is applied to each of the opposite surfaces thereof, then severing the pile between the backings and separating the fabric strips thus formed to facilitate the removal of the wires.

More specifically, the invention resides in that method of producing pile fabric which consists in simultaneously forming by means of wires a plurality of pile areas having loops on opposite surfaces of each area, assembling said areas in contiguous relation, applying to the opposite looped surfaces of the assembled areas a backing, severing the pile between the backings and then separating from each other the wires and the fabric strips thus formed.

The invention has more particular reference to a method of producing patterned pile fabric by successively assembling a plurality of rows of dyed yarns or threads in a multiplicity of machines upon temporary supporting means, then unloading and guiding the formed and supported pile through apparatus for applying the backing thereto prior to the removal of the temporary supporting means.

More specifically, the invention embodies a method of continuously producing patterned pile fabric which consists in successively passing through a battery of machines, members containing a plurality of sets of wires, temporarily removing independently a predetermined number of sets of said wires from said member while the same is in each machine and clamping rows of lengths of differently colored or shaded dyed yarns or threads between the wires to develop on the wires in said member a pile area having a pattern, then unloading the filled wires from said member, passing the filled wires through a backing apparatus for applying a backing to the pile, separating the pile and wires from each other, returning the empty wires and members to a common point and refilling the empty wires in the empty members for repassage through the battery of the machines.

The invention furthermore contemplates a method of producing pile fabric which includes the step of initially building a substantial pile area by alternately advancing wires which traverse the lay of a row of yarns or threads, from opposite sides of the plane of the lay to a new position on the other side of the plane of the lay for folding the yarn so as to dispose loops on opposite sides of the pile thus formed, which loops are designed to receive an adhesively applied backing prior to the removal of the wires.

The invention furthermore contemplates an improved method of producing pile fabric by virtue of which said fabric may be more readily and economically manufactured without sacrificing the quality of the finished product.

With the above recited and other objects and advantages in view, reference is had to the following description, the appended claims and the accompanying drawings, in which—

Figure 1 is a diagrammatic view illustrating the complete method for producing patterned pile fabric.

Figure 2 is a view illustrating the manner in which the row of yarns or threads is taken from the spool in the spool reel or carrier.

Figure 3 is a similar view illustrating the manner in which the row of yarns is positioned between the leaves of the wire supporting table.

Figure 4 is a similar view illustrating the manner in which the row of yarns or threads is clamped between one of the table leaves and the wires.

Figure 5 is a similar view illustrating the manner in which a second row of yarns or threads is positioned between the wires.

Figure 6 is a similar view illustrating the manner in which the clamped pair of yarn or thread rows is seperated with the wires and the manner in which the projecting ends of the yarn or thread rows are turned in for clamping between the sets of wires.

Figure 7 is a similar view illustrating the yarn or thread rows fully clamped between the sets of wires for return to the wire supporting drum.

Figure 8 is a similar view illustrating the manner in which the next row of yarns or threads is removed from the spool reel or carrier.

Figure 9 is a similar view illustrating the manner in which said row of yarns or threads is positioned between the table leaves.

Figure 17 is a sectional view through the spool reel or carrier, illustrating the arrangement of the spools.

Figure 18 is a side view of one of the spools, partly broken away and shown in section.

Figure 19 is a sectional perspective view of a set of wires with the yarns or threads emplaced.

Figure 20 is an enlarged transverse sectional view through a set of wires prior to the insertion of the yarn or thread rows.

Figure 21 is a similar view illustrating the thread rows in relative position to the set of wires.

Figure 22 is a view illustrating the initial step of separating a pair of wires and turning over the projecting ends of the thread or yarn rows.

Figure 23 is a similar view illustrating the manner in which the thread or yarn ends are turned inwardly between the wires.

Figure 24 is a similar view illustrating the separated wires moving inwardly to their final position.

Figure 25 is a similar view illustrating the rows of threads or yarns fully clamped in position between the set of wires.

Figures 26, 27, 28 and 29 are plan views of the wires which make up the set.

Figure 30 illustrates the wires in position in the guide through which the clamped pile forming material is led to the point where the backing is applied.

Figure 31 is a sectional view taken approximately on the line 31—31 of Figure 30.

Figure 32 is an enlarged fragmentary sectional view through the clamped pile with the backing applied and illustrating the manner in which the pile is severed.

Figures 33, 34 and 35 illustrate the manner in which the wires are co-related with the yarns or threads in producing an unpatterned pile fabric or a printed pattern fabric.

Figure 10:
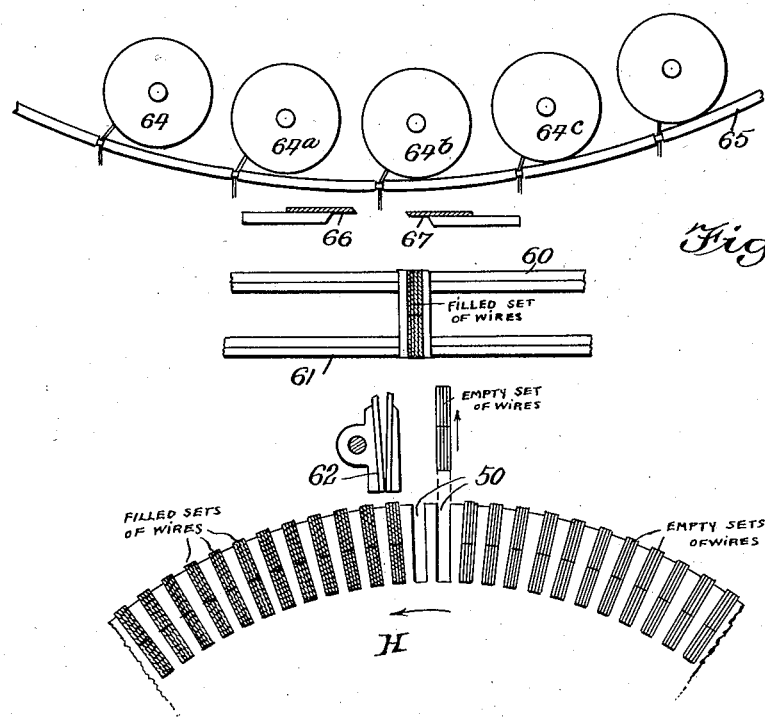
Figure 10 is a similar view illustrating the step in which the filled set of wires is about to be removed from the table and replaced in the drum while an empty set of wires is being fed from the drum to a position between the table leaves.
Figures 11, 12, 13, 14, 15, 16:
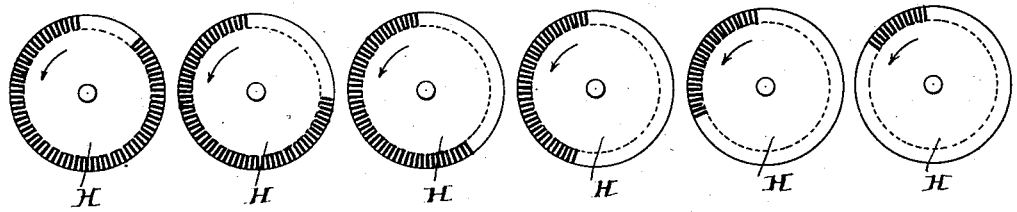
Figures 11, 12, 13, 14, 15 and 16 illustrate diagrammatically the successive loading of a drum with the filled sets of wires from the several machines.

Figure 36 diagrammatically illustrates the manner in which the sets of wires are unloaded from the drums and stacked to form a reservoir at a point in advance of the backing operation.

Figures 37, 38 and 39 diagrammatically illustrate one of the pressure devices.

Figure 40 is a cross sectional view taken approximately on the line 40—40 of Figure 38.

Figure 41 diagrammatically illustrates the manner in which the areas are developed.

Figure 42 is a diagrammatic view illustrating the manner in which individual rugs or pile fabrics of a given area may be produced.

Referring to the method of continuously producing a patterned pile fabric as illustrated in Figure 1, A, B, C, D, E and F designate a plurality or battery of machines, through which drums H are successively fed for loading sets of wires with the rows of yarn which are of contrastingly dyed colors, whereby to develop the pattern. Initially the drum H is brought into juxtaposition in the machine A, underlying the spool reel or carrier 65 thereof and the drum contains in each of its peripheral pockets 50, a set of eight wires 51, 52, 53, 54, 55, 56, 57 and 58. By virtue of suitable mechanism (not shown), the initial set of wires is elevated and received and supported on the table leaf 60 which then separates with respect to the other table leaf 61. A nipper 62 then moves upwardly between the separated table leaves and grasps the ends of the yarns or threads which are wound on the first spool 64 in the rotary spool reel or carrier 65. The nipper then moves downwardly, unwinding the desired length of yarn or thread from the spool 64, and cooperating shearing blades 66 and 67 cut off the yarns or threads. The nipper 62 continues downwardly until the severed lengths are brought in juxtaposition to the table leaves 60 and 61. The leaves 60 and 61 then move toward each other until the face of the leaf 61 contacts with the row of severed yarns or threads, as illustrated in Figure 3. The table leaf 60 carrying the sets of wires 51, 52, 53, 54, 55, 56, 57 and 58 then advances over toward, contacts with and clamps the row of yarns between the same and wires 51 and 52. The leaves then separate as illustrated in Figure 4, leaving wires 51, 52, 53, 54, 55 and 56 supported on table leaf 61 with the row of yarns or threads clamped in position while wires 57 and 58 are carried back by and with leaf 60. The nipper 62 then repeats its operation but this time grasps the ends of the yarns or threads on the succeeding or next adjacent spool 64a, drawing down a similar length of the yarns or threads to the proper position between the leaves, which then are advanced toward each other so that the second row of yarns or threads is clamped between wires 55 and 56 and 57 and 58, as illustrated in Figure 5. The leaves 60 and 61 then separate slightly to the position illustrated in Figure 6, the leaf 60 retaining thereon the wires 51 and 52 with the first row of yarns or threads clamped between the same and the end of the leaf 61. The leaf 60 carries with it the other row of yarns clamped between wires 55, 56, 57 and 58. As the leaves separate, the wire 53 moves upwardly and the wire 54 downwardly, while fingers 68, 69, 70 and 71 move horizontally and engage the projecting terminals of the yarns or threads, as illustrated in Figures 6 and 22. The fingers 69 and 71 then move downwardly simultaneously with the upward movement of the fingers 68 and 70, to deflect the yarn terminals inwardly to a position between the wires 51, 52, 55 and 56. At the same time, the leaves of the table 60 and 61 are advanced toward each other while the raised and lowered wires 53 and 54 follow inwardly between the fingers which then move outwardly from between the wires, permitting the wires 53 and 54 to hold and continue to deflect the yarn terminals inwardly. In order to provide means for selective movement of the wires, each pair of each set of eight wires, as illustrated in Figures 26 to 29, inclusive, is formed with the differently spaced controlling lugs for the engagement therewith of suitable actuating means (not shown). The wires 51 and 52 are formed with the lugs a and b respectively, the wires 53 and 54 with apertured lugs c and d respectively, the apertures serving as means whereby the wires 53 and 54 may be raised and lowered. The wires 55 and 56 are provided with the lugs e and f respectively, the wires 57 and 58 are formed with the lugs g and h respectively. It will also be observed that all of the wires are formed with heads i having T-shaped notches j, with which the T-shaped ribs or rails k of the channel shaped guides 80 coact to maintain the same in a predetermined relation. Every third set of wires is provided with slightly shorter heads so that when the same are arranged in the guideway, the longer and shorter heads properly coact with the feeding means or sprocket chain 81, as illustrated in Figures 30 and 31.

The filled set of wires is then moved downwardly by a suitable means (not shown) and returned to the peripheral pocket 50 of the drum H from which it was initially extracted, and while the filled set of wires is moving downwardly an empty set of wires is moved upwardly to position for receiving a double row of threads from the two succeeding spools 64b and 64c. Each drum is passed successively through the battery of machines A, B, C, D, E and F and a portion of the pattern is developed by the filling of the number of sets of wires in each of said machines which correspond to one-half the number of spools in each spool carrier or reel, so that each drum when completely filled by the battery of machines will have the fully developed pattern thereon when it reaches the unloading point I, as diagrammatically illustrated in Figure 41. At this point, the sets of wires are successively removed from the peripheral pockets 50 of the drum and stacked to form a reservoir or supply J of filled sets of wires. The removal of the sets of wires from the peripheral pocket may be accomplished in any desired manner, such as by the engagement therewith of the oscillating finger 75 which is caused to engage behind the edges of the sets of wires in the pocket and to advance them radially outward therefrom onto an inclined support 76 which is shifted upwardly through the medium of the cam 77. As the support 76 moves upwardly, the sets of wires are deposited and stacked on a platform 78 and the stacks are gradually advanced by a device 79 to a point in alignment with channel shaped guides 80. Suitable feeding means, such as a sprocket chain 81, is trained through the guides 80 to coact with the wires. As the stacks of wires move downwardly through the guides, the opposite outwardly disposed looped portions of the threads or yarns are coated by a coating mechanism K with an adhesive substance, and at a point further below the point of coating while the same is in a tacky condition a backing material L is applied. The pile with the coating and backing applied next advances downwardly to a point between opposed pressure devices M where the pressure is applied. The pressure devices M are provided with means M' operated thereby for successively engaging the upper ends of the stack of wires and moving the same downwardly. In the event that the coating material requires heat for setting the same, this may be supplied in any well known manner during the application of the pressure by the pressure devices M. After the pressure is applied, the pile with the backing now firmly adhering thereto through the medium of the adhesive coating is moved downwardly below the pressure means and the pile is severed between the wires by a severing means N, such as a band knife. The severed pile, together with the coating and backing and with the wires still positioned in the pile, is then deflected laterally over guides O to a point where the completed fabric strips P are removed from the wires by deflection therefrom over the guides Q. The wires are then conveyed by the conveyor means R to the point S where they are again related in sets and filled into the empty drums H which have been conveyed from the unloading point I to the point S. The pile fabric strip thus produced is wound in rolls T after its separation from the wires. It is, of course, understood that the pattern which is developed is repeated on each drum and the repeat is limited only by the size of the drums and the number of machines A to F which are employed for the purpose of developing the pattern.

The pressure devices M are preferably constructed so as to produce a continuous pressure and movement upon the pile fabric and as shown in Figures 37, 38 and 39, said devices include a plurality of independently movable sections 85, 86 and 87. Initially all of the sections move down a predetermined distance and then the sections 85 are moved out of contact with the fabric and upwardly, thence inwardly against the fabric to repeat the downward movement, thence the sections 86 move out of contact with the fabric upwardly and to a point in line with the sections 85, thence inwardly against the fabric and downwardly with the sections 85 while the section 86 moves out of contact with the fabric and moves upwardly to alignment with the preceding section and thence downwardly. This operation is constantly repeated to set up in effect a "crawling pressure" which in addition to pressing the adhesively connected backing serves as the means for feeding the same throughout the guides 80.

It is, of course, understood that in practice the spools 64, etc. are of the conventional type in which the spirally wound yarns or threads 88 are so arranged as to develop the pattern in the fabric. This is clearly shown in Figure 18 of the drawings and it is understood that each spool of the several machines is so wound with differently colored or shaded yarns or threads as to bring out the desired pattern in the finished product.

In developing an unpatterned fabric or a fabric in which the yarns 90 are printed to develop a pattern, the wires 91, 92, 93, 94, 95, 96, 97 and 98, as shown in Figure 33, are alternately advanced edgewise against the row of yarns 90 in the manner illustrated in Figure 34, wherein wire 91 moves from a position at the right side of the plane of the normal lay of the row of yarns to a position on the other or left side thereof to deflect the yarns in the manner shown. The wire 92 is then advanced edgewise from its position on the left side of the plane of the normal lay of the row of yarns 90 to the opposite or right side thereof and thence downwardly into the same horizontal plane as the wire 91. The succeeding pairs of wires follow in the same order until a pile is built in the manner illustrated in Figure 35. The backing is then applied to the looped portions 99 of the pile, and it will be clearly apparent that by severing the pile along the line 100 to 100 in Figure 36, that a double strip of pile fabric will be produced.

Within the scope of the invention, it is apparent that individual rugs of standard sizes may be developed with a pattern under the present method by building up simultaneously a plurality of pile areas on a number of machines and then assembling said areas for coating, backing, pressing, severing of the pile and separation of the same to produce the finished rug. This phase of the method is best illustrated in Figure 42, in which reference characters 101 to 106 and 107 to 112, 113 to 118, and 119 to 124 illustrate the successive steps in building up simultaneously on a plurality of machines, a number of pile fabric areas by means of wires which support the same. The pile areas developed from 101 to 106 and from 107 to 112 are assembled contiguously, as shown at 125, and the assembled areas are then advanced to receive in contiguous relation thereto the pile areas which are developed at 113 to 118 and at 119 to 124 to form the pile area 126 which is then coated at 127, backed at 128, with the pressure applied thereto at 129 and the separation of the pile between its backing accomplished at 130 to produce two completed rugs or pile fabric sections. In practice, assuming that it is desired to produce a 9 by 12 rug, six inches of pile nine feet in width will be formed simultaneously on twenty-four machines so that twenty-four six-inch sections of pile when brought together in contiguous relation at the point 126 will form an assembled pile area of twelve feet long and nine feet wide. When coated, backed, pressed, severed and separated, it will be found that two 9 by 12 rugs or pile fabric sections have been produced.

While there have been illustrated and described certain instrumentalities and mechanisms for carrying the method into practice, it is to be understood that the same are in no way intended as a limitation upon the scope of the invention and that equivalents thereof may be resorted to when found expedient. In describing the method, the terms "yarns" and "threads" have been interchangeably used and these terms are intended to cover any form of staple which may be employed for the purpose of producing pile fabric.

What is claimed is:

1. A method of producing pile fabric consisting in arranging and supporting a row of yarns or threads in juxtaposition by means of four wires arranged as two pairs of wires having their innermost edges in the same plane and their innermost sides in a bi-secting plane, tiering said pairs of wires with other pairs, similarly supporting rows of yarns or threads so as to form pile sections, subsequently applying a backing to the yarns or threads where they extend beyond the plane defined by the outer edges of the wires, severing between the wires and removing the support from between the rows of yarns or threads to produce two pieces of pile fabric.

2. A method of producing pile fabric consisting in initially forming by clamping between adjacent wires of a pair of rows of wires, a substantial pile area; subsequently applying a backing to the opposite surfaces of the pile area, severing between the backings and rows of wires to produce two strips of pile fabric and then removing the wires from the fabric.

3. A method of producing pile fabric which consists in building a pile by clamping the staple between wires, conveying the clamped pile to a remote point, applying a backing to the opposite surfaces of the pile at said point, severing the pile between the backings and then separating the fabric strips thus formed.

4. A method of producing pile fabric which consists in building a pile by clamping the staple between wires, conveying the clamped pile to a remote point, applying a backing to the opposite surfaces of the pile at said point, severing the pile between the backings, separating the fabric strips thus formed and then separating the wires from the fabric strips.

5. A method of producing pile fabric consisting in simultaneously forming by means of wires, a plurality of pile areas having loops on the opposite surfaces of each area; assembling said areas in contiguous relation; subsequently applying to the opposite looped surfaces of the contiguous areas a backing; severing the pile between the backings and removing the wires after the severance.

6. A method of producing pile fabric consisting in simultaneously forming by means of wires, a plurality of pile areas having loops on the opposite surfaces of each area; assembling said areas in contiguous relation; coating the opposite looped surfaces of said contiguous areas with an adhesive backing substance; severing the pile between the backings and removing the wires after said severance.

7. A method of producing patterned pile fabric consisting in arranging pile forming material of various colors or characters in such a manner as the pattern may require, separating rows of pile forming material from its source, temporarily maintaining said material in the form of a pile by means of wires arranged in pairs, tiering the filled wires with others to develop pile areas and subsequently applying a backing thereto.

8. A method of producing patterned pile fabric consisting in successively assembling detached individual rows of dyed yarns of contrasting colors in clamped relation between the successive wires of a series of pairs of wires assembled as a double row of wires and subsequently applying a backing thereto.

9. A method of producing patterned pile fabric consisting in successively assembling detached rows of dyed yarns of contrasting colors between the tiers of a series of pairs of supporting elements and subsequently applying a backing thereto.

10. A method of continuously producing patterned pile fabric consisting in successively passing through a battery of machines, drums containing a plurality of sets of wires, temporarily removing a predetermined number of sets of wires independently from said drum while in each machine and clamping rows of lengths of differently colored or shaded yarns or threads between the wires to develop on the wires in said drum a pile area having a pattern.

11. A method of continuously producing patterned pile fabric consisting in successively passing through a battery of machines, carriers in which a plurality of sets of wires are arranged, temporarily removing a predetermined number of sets of wires successively from said carrier while in each machine and clamping rows of lengths of differently colored or shaded yarns or threads between the wires to develop on the wires in said carrier a pile area having a pattern; unloading the filled wires from said carriers; passing the filled wires through a backing apparatus for applying a backing to the pile; removing the wires from the pile; returning the empty wires and empty carriers to a common point, and refilling the empty wires in the empty carriers for re-passage through the battery of machines.

12. A method of producing pile fabric, including the step of initially building a substantial pile area by alternately advancing wires from the opposite sides of the plane of the lay of a row of yarns or threads, to a new position on the opposite side of the plane of the lay and moving the wires advanced from one side in the direction of the plane of the lay and into the same plane with the preceding wire for folding the yarn so as to dispose loops on opposite sides of the pile thus formed.

13. A method of producing patterned pile fabric having a looped pile in which the looped portion is secured to a backing consisting in forming and developing independently of a backing, a patterned pile area presenting oppositely disposed looped portions, subsequently applying a backing to said opposite looped portions and severing the pile between the backings to produce two strips of similarly patterned pile fabric.

14. A method of producing patterned pile fabric having a looped pile in which the looped portion is secured to a backing consisting in forming and developing independently of a backing, a patterned pile area presenting oppositely disposed looped portions, subsequently applying an adhesive backing to said opposite looped portions and severing the pile between the backings to produce two strips of similarly patterned pile fabric.

15. A method of producing patterned pile fabric having a looped pile in which the looped portion is secured to a backing consisting in forming independently of a backing, a pile area having a pattern and provided with loops on its opposite sides, supporting the same by a temporary supporting means, applying a backing to the looped opposite sides of said pile area and severing the pile between said backings to produce two strips of similarly patterned pile fabric and freeing the supporting means therefrom.

16. A method of producing patterned pile fabric having a looped pile in which the looped portion is secured to a backing consisting in forming independently of a backing, a pile area arranged to develop a pattern and provided with looped outer sides, supporting the same by a temporary supporting means divided in the plane of the area, applying a backing to the looped outer sides of said pile area, severing the pile between the division of the supporting means and then separating the temporary supporting means and the pile subsequent to the application of the backing.

17. A method of producing patterned pile fabric consisting in presenting successively to a series of machines, a plurality of sets of temporary pile clamping and supporting elements for receiving from the machines rows of pile forming material of contrasting shades or colors, assembling in contiguous relation said rows of pile forming material to develop a patterned pile area when supported by said elements, subsequently applying a backing thereto and separating the elements from the pile after the application of the backing.

18. A method of producing pile fabric consisting in initially building a substantial pile area by alternately advancing wires from the opposite sides of the plane of the lay of a row of yarns or threads, to a new position on the other side of the plane of the lay, for folding and temporarily supporting the yarn so as to dispose loops on opposite sides of the pile thus formed, applying a backing to the opposite looped portions thereof, severing the pile between the backings and then separating the wires from the severed pile by direct relative movement axially of the pile.

19. In a method of producing pile fabric which consists in initially forming by means of wires, a substantial pile area, subsequently applying a backing to the opposite surfaces of the pile area and severing between the backings to produce two strips of pile fabric; the step of separating the wires from the pile consisting in relatively moving the wires and pile fabric coincident with the axis of the pile.

20. In a method of producing pile fabric which consists in initially forming by means of wires, a substantial pile area, subsequently applying a backing to the opposite surfaces of the pile area and severing between the backings to produce two strips of pile fabric; the step of separating the wires from the pile consisting in moving the pile fabric in an arcuate path while moving the wires in a straight line at a tangent thereto, whereby the pile is spread radially and withdrawn axially from the wires.

21. A method of producing patterned pile fabric consisting in successively assembling rows of yarns of a contrasting character in clamped relation between two rows of wires superposed within the height of the pile, subsequently applying a backing to the opposite ends of the pile and severing the pile between the wire rows.

22. A method of producing patterned pile fabric consisting in successively assembling rows of yarn of a contrasting character in clamped relation between two rows of wires superposed within the height of the pile, subsequently adhesively applying a backing to the opposite ends of the pile and severing the pile between the rows of wires.

23. A method of continuously producing a pile area of a predetermined contour consisting in successively passing through a battery of machines, carriers in which a plurality of sets of wires are arranged, temporarily removing a predetermined number of sets of wires from said carrier while in each machine and clamping rows of lengths of variously spaced yarns or threads between the wires to develop on said wires in said carrier a pile area having said predetermined contour.

24. A method of producing pile fabric including the step of building a pile area between adjacent wires arranged as a pair of rows so as to form loops extending around the outermost edges of all of the wires by alternately advancing wires from opposite sides of the plane of the lay of the pile forming material.

25. A method of producing pile fabric including the step of building a pile area between adjacent wires arranged as a pair of rows so as to form loops extending around the outermost edges of all of the wires by alternately advancing wires from opposite sides of the plane of the lay of the pile forming material and moving the wires advanced from one side in the direction of the plane of the lay and into the same plane with each alternate preceding wire.

26. A method of producing pile fabric including the step of initially building a substantial pile area by alternately advancing wires from two sets of wires, one on either side of a row of yarns or threads or fibres, to a new position on the opposite side of the normal plane of said yarns, threads or fibres so as to bring the yarns, threads or fibres in contact with both sides and both edges of each wire as finally arranged in a double row, coating with a backing, the exposed portions of the yarns, threads or fibres and severing between the rows of wires to produce two strips of pile fabric.

27. A method of producing pile fabric including the step of initially building a substantial pile area by alternately advancing wires from two sets of wires, one on either side of a row of yarns or threads or fibres, to a new position on the opposite side of the normal plane of said yarns, threads or fibres so as to bring the yarns, threads or fibres in contact with both sides and both edges of each wire as finally arranged in a double row, adhesively applying a backing to the exposed portions of the yarns, threads or fibres and severing between the rows of wires to produce two strips of pile fabric.

28. A method of producing pile fabric consisting in the withdrawal of a predetermined length of pile forming material from a source of supply, severing said material from said source, conveying it to a clamping device, clamping the material by means of pairs of wires so as to form a pile, associating the individual pairs of wires on which a pile has been formed with others to form a pile area, subsequently applying a backing to the pile area, severing in the plane formed by the innermost edges of the individual pairs of wires to form two pieces of pile fabric.

29. A method of producing pile fabric consisting in successively passing through a machine, a carrier in which a plurality of sets of wires are arranged, removing a set of wires from said carrier while in the machine, clamping rows of lengths of pile forming material in said set of wires and depositing said filled set of wires in a carrier, together with other filled sets of wires to develop a pile area.

30. A method of producing pile fabric consisting in successively passing through a machine, a carrier in which a plurality of sets of wires are arranged, removing a set of wires from said carrier while in the machine, clamping rows of lengths of pile forming material in said set of wires and depositing said filled sets of wires in a carrier, together with other filled sets of wires to develop a pile area; unloading the filled wires from said carriers; passing the filled wires through a backing apparatus for applying a backing to the pile; removing the wires from the pile; returning the empty wires and empty carriers to a common point, and refilling the empty wires in the empty carriers for re-passage through the battery of machines.

31. A method of producing patterned pile fabric consisting in forming and developing a patterned pile area independently of a backing by the assemblage of alternate rows of detached sections of pile forming material of various colors of characters, maintaining said rows in alignment by spacing elements interposed between adjacent rows and subsequently applying a backing thereto.

32. A method of producing patterned pile fabric consisting in forming and developing a patterned pile area independently of a backing by the assemblage of alternate rows of detached sections of pile forming material of various colors or characters, maintaining said rows in alignment by spacing elements interposed between adjacent rows and subsequently applying an adhesive backing thereto.

33. A method of producing patterned pile fabric having a looped pile in which the looped portion is secured to a backing, consisting in forming pile areas by the accumulation of independent rows of pile forming material of various colors or characters, folding each independent row about a pair of wires to develop two sets of pile tufts, holding the rows in place and the free ends in position by adjacent contacts upon either side, adhesively applying a backing to the exposed loops of the pile forming material and severing between the backings to produce patterned pile fabric.

34. A method of producing pile fabric consisting in passing through a machine a number of wires, arranging pile forming material between adjacent pairs of said wires, assembling the filled wires to generate pile areas, subsequently coating said areas and severing between the wires to produce the pile fabric.

35. In a method of producing pile fabric which consists in initially forming by means of wires, a substantial pile area and subsequently applying a backing thereto; the step of removal of the wires consisting of a movement of the same away from the backing in the direction of the top of the pile.

36. In a method of producing pile fabric which consists in initially forming by means of wires, a substantial pile area and subsequently applying a backing to the pile area thus formed; the step of separating the wires from the pile consisting in disposing the pile area so as to cause adjacent pile rows to diverge for facilitating the separation of the wires from said pile area.

37. A method of producing pile fabric of a predetermined contour consisting in passing through a machine a number of wires, arranging pile forming material between adjacent pairs of said wires, assembling the filled wires to generate a pile area of said contour, subsequently coating said pile area and severing between the wires to produce pile fabric.

38. A method of producing pile fabric including the steps of developing pile areas, independently of each other, by employing in connection with each area developed, a plurality of proximately located pile wires, between the adjacent faces of which, the pile forming material is held in shape and position, and, subsequent to the independent development of said areas, assembling said areas in contiguous relation for adjoining the same by a continuous backing.

39. A method of producing patterned pile fabric including the steps of maintaining in proper position by clamping between adjacent pile wires, a row of detached yarn lengths, certain of which lengths are of a contrasting color or character with reference to each other, folding said lengths over the edges and about said wires, thereby presenting outwardly disposed loops for the reception of the backing material and then applying said backing material to said loops.

40. A method for expeditiously producing rugs, carpets or analogous pile fabric, particularly those having a pattern, consisting in arbitrarily separating the area of the fabric to be produced, into a number of sections, developing each section independently by means of a succession of pile wires employed to maintain the pile forming material in proper location through the proximity of each wire to its adjacent wire, assembling the developed sections in the proper order and then forming them into a complete rug, carpet or pile fabric by means of a common backing adhesively applied.

41. In a method of producing pile fabric by means of wires in which the wires employed to generate the pile are within the folds of the pile until they are made free by the cutting of said pile, the step of separating the wires from the fabric consisting in moving the pile fabric and wires in divergent paths to facilitate such operation.

42. A method of producing rugs, carpets or analogous pile fabrics consisting in forming and developing pile areas, maintaining the pile formation of such areas by means of a provisional backing and then assembling a series of such areas and adjoining them by means of a continuous backing to develop a unit fabric.

43. A method of producing pile fabric having a looped pile in which the looped portion is secured to a backing, consisting in forming pile areas by the accumulation of independent rows of the pile forming material folding each independent row about a temporary spacing element, associating a series of independent rows maintained by spacing elements to form an area and adhesively applying a backing to the exposed loops to form a fabric.

HORACE B. BRAINARD.